(12) United States Patent
Fujii et al.

(10) Patent No.: US 7,150,801 B2
(45) Date of Patent: Dec. 19, 2006

(54) PROCESS FOR PRODUCING COLD FIELD-EMISSION CATHODES

(75) Inventors: Takashi Fujii, Tsukuba (JP); Masao Someya, Tsukuba (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 60 days.

(21) Appl. No.: 10/784,211

(22) Filed: Feb. 24, 2004

(65) Prior Publication Data

US 2004/0166235 A1    Aug. 26, 2004

(30) Foreign Application Priority Data

Feb. 26, 2003   (JP) ............................. 2003-049195

(51) Int. Cl.
   *B32B 37/00*   (2006.01)
(52) U.S. Cl. ...................... 156/234; 156/235; 156/237; 156/249; 427/77
(58) Field of Classification Search ................ 156/230, 156/234, 235, 237, 238, 247, 249; 427/77, 427/249.1
See application file for complete search history.

(56) References Cited

U.S. PATENT DOCUMENTS

| | | | | |
|---|---|---|---|---|
| 6,019,656 A * | 2/2000 | Park et al. | ..................... | 445/24 |
| 6,097,138 A * | 8/2000 | Nakamoto | ................... | 313/309 |
| 6,146,230 A * | 11/2000 | Kim et al. | ..................... | 445/51 |
| 6,239,547 B1 * | 5/2001 | Uemura et al. | ............. | 313/495 |
| 6,250,984 B1 * | 6/2001 | Jin et al. | ..................... | 445/51 |
| 6,436,221 B1 * | 8/2002 | Chang et al. | ............... | 156/247 |
| 6,692,791 B1 * | 2/2004 | Chang et al. | ................. | 427/77 |
| 6,712,864 B1 * | 3/2004 | Horiuchi et al. | .............. | 23/314 |
| 2003/0080663 A1 | 5/2003 | Ito | | |

FOREIGN PATENT DOCUMENTS

| | | |
|---|---|---|
| EP | 1 061 554 | 12/2000 |
| JP | 11-260249 | 9/1999 |
| WO | WO 00/30141 | 5/2000 |
| WO | WO 00/73204 | 12/2000 |

OTHER PUBLICATIONS

Heer et al., A Carbon Nanotube Field-Emission Electron Source, vol. 20, Nov. 17, 1997, pp. 1179-1180.
Choi et al., Fully Sealed, High-Brightness Carbon-Nanotube Field-Emission Display, Applied Physics Letters, vol. 75, No. 20, Nov. 15, 1999, pp. 3129-3131.
Iijima, Helical Microtubles of Graphitic Carbon, Nature, vol. 354, Nov. 7, 1991, pp. 56-58.

* cited by examiner

*Primary Examiner*—James Sells
(74) *Attorney, Agent, or Firm*—Roylance, Abrams, Berdo & Goodman, L.L.P.

(57) ABSTRACT

A process for producing a cold field-emission cathode by patterning an aligned carbon nanotube film on a surface of a substrate for electrode, comprising the steps of preparing an aligned carbon nanotube film on a surface of a basic substrate, patterning a conductive binder on a surface of a substrate for electrode, and bonding a surface of the aligned carbon nanotube film to a surface of the conductive binder and then transferring the aligned carbon nanotube film by stripping the basic substrate, leaving those portions of the aligned carbon nanotube film behind which have been bonded to the conductive binder.

37 Claims, 4 Drawing Sheets

PROCESS FOR PRODUCING COLD FIELD-EMISSION CATHODES

BACKGROUND OF THE INVENTION

This invention relates to the manufacture of cold cathodes from aligned carbon nanotube (hereunder CNT) films of uniform shape that are formed in pattern on an electrode to achieve field emission of electrons of uniform intensity at low voltage. The technology of the invention is applicable to thin image displays such as a field emission display (hereunder FED).

First discovered by S. Iijima (see S. Iijima, "Helical microtubules of graphite carbon", Nature, 354, p. 56–58 (1991)), CNTs are carbon materials in a very narrow hollow tubular form which typically range from 0.5 to 100 nm in diameter and from 1 to 100 μm in length. Today, CNTs hold promise in their application as field-emission electron sources. An electrode on which field-emission electron sources are arranged is supplied with negative voltage and emits no heat; hence, it is called a cold cathode. In particular, if CNT is used as an electron source to image displays such as FED, a multiple of CNTs must be employed since a single CNT is insufficient to provide the required emission of electrons. Furthermore, the inherent electron sources that are required to turn on the individual pixels in an FED must be insulated when the control circuit is energized.

Various methods are known in the art of producing cold cathodes capable of field emission of electrons from CNTs and they are divided into two major types, one of preparing CNTs in a separate step and depositing them on an electrode and the other of allowing CNTs to grow directly on an electrode. Methods of the first group include the following: 1) mixing CNT with conductive paste and pattering the mixture on an electrode by screen printing (see, for example, JP 11-260249 A); 2) mixing CNT with a solvent or a binder and dripping, applying or spraying the mixture to form a CNT layer on an electrode (see, for example, US 2003/0080663 A1); 3) mixing CNT with a solvent or a binder and extruding the mixture through a metal screen onto an electrode (see, for example, W. B. Choi and ten others, "Fully sealed high-brightness carbon-nanotube field-emission display", Applied Physics Letters, 75, 20, p. 3129–3131 (1999)); and 4) passing a CNT suspension through a filter to form a CNT layer on a surface of the filter and transferring the CNT layer to an electrode (see, for example, W. A. de Heer and two others, "A Carbon Nanotube Field-Emission Electron Source", Science, 270, p. 1179–1180 (1995)).

As a transfer method of the type described in W. A. de Heer and two others, "A Carbon Nanotube Field-Emission Electron Source", Science, 270, p. 1179–1180 (1995), a process comprising the steps of causing an aligned CNT film to grow on a substrate and transferring it to a second substrate has been disclosed although no mention is made of a process for producing cold cathodes capable of field emission of electrons (see, for example, WO 00/73204). A method of the second group which allows CNT to grow directly on an electrode is characterized in that a catalyst deposited in predetermined positions on a surface of a substrate for electrode is subjected to CVD, thereby growing CNTs that are aligned perpendicular to the electrode (see, for example, WO 00/30141 and EP 1061554 A1).

The methods of mixing CNT with a solvent or a binder and depositing the mixture on an electrode as described in JP 11-260249 A, US 2003/0080663 A1 and W. B. Choi and ten others, "Fully sealed high-brightness carbon-nanotube field-emission display", Applied Physics Letters, 75, 20, p. 3129–3131 (1999) are characterized in that the adhesion between electrode and CNT is sufficiently increased and also in that the adhesion provides good electrical continuity. However, CNT and other nano-scale substances have a great tendency to aggregate and are not easy to mix uniformly with other flowable substances. If an uneven mixture of CNT and other flowable substances is just deposited on an electrode, the CNT contained in the individual electron sources on the electrode does not have uniform density and in the presence of asperities on the surface of each electron source, only uneven image will be produced from the fabricated image display. With a view to mixing CNT with other flowable substances as uniformly as possible, one may increase the proportion of the solvent. However, if the solvent remains on the electrode, the field emission of electrons in high vacuum will be hampered, so the use of the solvent is desirably minimized.

In the method of transfer described in W. A. de Heer and two others, "A Carbon Nanotube Field-Emission Electron Source", Science, 270, p. 1179–1180 (1995), no binder is used and the solvent is removed by filtration. However, the CNT film on the filter is immediately deposited on an Teflon sheet as the electrode, so this method is not suitable for patterning purposes. Another problem concerns the adhesion between electrode and CNT.

In order to fabricate a cold cathode that is capable of field emission of electrons and which is suitable for use on FED, the aligned CNT film must be patterned in blocks and the control circuit be energized with individual blocks being kept insulated. However, WO 00/73204 does not disclose any method of forming a pattern of aligned CNT film on the surface of a substrate for electrode.

As taught in WO 00/30141 and EP 1061554 A1, CVD may be applied to a substrate for electrode so as to form a pattern of aligned CNT film. However, the substrate for electrode employed in those methods is exposed to high-temperature carbon precipitating conditions which may potentially deteriorate the material of the substance.

In order to operate an image display using a cold cathode capable of field emission of electrons, it is advantageous that electrons of uniform intensity are emitted at the lowest possible voltage. To this end, a multiple of CNT electron sources to be used in the cold cathode capable of field emission of electrons are preferably of such a shape that the individual CNTs form unit films in which they are aligned vertically to the electrode at a specified height and that the individual films are electrically insulated from each other. If the vertical alignment requirement is met, the multiple of CNT electron sources put together can provide a maximum sum intensity of electron emission in vertical direction. If the individual films are uniform in height to present smooth even surfaces, electron emission that can be obtained is uniform in planar direction. In the case of field emission of electrons, the smaller the distance between the tip of each CNT and the anode, the lower the voltage that is required to extract electrons. Hence, given a constant height of electrode sources in each unit film, the anode can be installed very close to the surfaces of the electron sources without compromising the uniformity of distance and the applied voltage for obtaining the same intensity of electron emission can be lowered.

SUMMARY OF THE INVENTION

The present invention has been accomplished under those circumstances and its primary objective is to provide a process for producing a cold field-emission cathode that uses a multiple of CNTs as electron sources, characterized in that the CNTs as electron sources form unit films in which they are aligned vertically, which present smooth surfaces at uniform density, and which are patterned at uniform height to be electrically insulated from each other, thereby enabling uniform electron emission at low voltage.

As a means of attaining the stated object, the process of the invention for producing a cold field-emission cathode comprises the steps of preparing an aligned CNT film on a surface of a substrate, patterning a conductive binder on a surface of a substrate for electrode, bonding a surface of the aligned CNT film to a surface of the conductive binder, optionally curing the conductive binder, and stripping from the first substrate only those portions of the aligned CNT film which have been bonded to the conductive binder.

Thus, the present invention basically provides a process for producing a cold field-emission cathode by patterning an aligned carbon nanotube film on a surface of a substrate for electrode, comprising the steps of (1) preparing an aligned carbon nanotube film on a surface of a basic substrate, (4) patterning a conductive binder on a surface of a substrate for electrode, and (5) bonding a surface of the aligned carbon nanotube film to a surface of the conductive binder and then transferring the aligned carbon nanotube film by stripping the basic substrate, leaving those portions of the aligned carbon nanotube film behind which have been bonded to the conductive binder (this process is hereunder referred to as process A).

Preferably provided between steps (1) and (4) is the step (2) of bonding a surface of the aligned carbon nanotube film to a surface of a flexible substrate having a reversibly adhesive surface and then transferring the aligned carbon nanotube film by stripping the basic substrate, leaving those portions of the aligned carbon nanotube film behind which have been bonded to the surface of the flexible substrate.

Thus, the present invention also provides a process for producing a cold field-emission cathode by patterning an aligned carbon nanotube film on a surface of a substrate for electrode, comprising the steps of (1) preparing an aligned carbon nanotube film on a surface of a basic substrate, (2) bonding a surface of the aligned carbon nanotube film to a surface of a flexible substrate having a reversibly adhesive surface and then transferring the aligned carbon nanotube film by stripping the basic substrate, leaving those portions of the aligned carbon nanotube film behind which have been bonded to the surface of the flexible substrate, (4) patterning a conductive binder on a surface of a substrate for electrode, and (5') bonding to a surface of the conductive binder a surface of the aligned carbon nanotube film that has been transferred to the flexible substrate and then transferring the aligned carbon nanotube film by stripping the flexible substrate, leaving those portions of the aligned carbon nanotube film behind which have been bonded to the conductive binder (this process is hereunder referred to as process B).

More preferably, the following step (3) is provided between steps (2) and (4): bonding to a surface of a second flexible substrate having a reversibly adhesive surface a surface of the aligned carbon nanotube film that has been transferred to the first flexible substrate and then transferring the aligned carbon nanotube film by stripping the first flexible substrate, leaving those portions of the aligned carbon nanotube film behind which have been bonded to the surface of the second flexible substrate. Thus, the present invention also provides a process for producing a cold field-emission cathode by patterning an aligned carbon nanotube film on a surface of a substrate for electrode, comprising the steps of (1) preparing an aligned carbon nanotube film on a surface of a basic substrate, (2) bonding a surface of the aligned carbon nanotube film to a surface of a flexible substrate having a reversibly adhesive surface and then transferring the aligned carbon nanotube film by stripping the basic substrate, leaving those portions of the aligned carbon nanotube film behind which have been bonded to the surface of the flexible substrate, (3) bonding to a surface of a second flexible substrate having a reversibly adhesive surface a surface of the aligned carbon nanotube film that has been transferred to the first flexible substrate and then transferring the aligned carbon nanotube film by stripping the first flexible substrate, leaving those portions of the aligned carbon nanotube film behind which have been bonded to the surface of the second flexible substrate, (4) patterning a conductive binder on a surface of a substrate for electrode, and (5') bonding to a surface of the conductive binder a surface of the aligned carbon nanotube film that has been transferred to the second flexible substrate and then transferring the aligned carbon nanotube film by stripping the second flexible substrate, leaving those portions of the aligned carbon nanotube film behind which have been bonded to the conductive binder (this process is hereunder referred to as process C). In process C, step (3) may be performed only once or it may be repeated two or more times.

DETAILED DESCRIPTION OF THE INVENTION

The invention is described below in detail. Process A which constitutes the core of the invention can be implemented by the sequence of the steps of (1) preparing an aligned carbon nanotube film on a surface of a basic substrate, (4) patterning a conductive binder on a surface of a substrate for electrode, and (5) bonding a surface of the aligned carbon nanotube film to a surface of the conductive binder and then transferring the aligned carbon nanotube film by stripping the basic substrate, leaving those portions of the aligned carbon nanotube film behind which have been bonded to the conductive binder.

We first describe step (1). In this step, a supporting substrate that is coated with an element or a compound that do not have a catalytic reactivity on their own and which is allowed to carry another metal element having catalytic reactivity or a compound thereof is used as a basic substrate for CNT growth and a carbon compound is decomposed, thereby growing a CNT film on a surface of the basic substrate such that it is aligned vertically to the substrate.

The supporting substrate may be formed of ceramics, quartz, silicon wafer, etc. and ceramic substrates made of silica alumina or alumina are preferred.

The element or compound that do not have a catalytic reactivity on their own may be referred to as inert substances and aluminum or germanium or oxides thereof are preferred examples. Coatings of these elements or compounds (inert substances) which do not have a catalytic reactivity on their own are preferably formed by vacuum evaporation, electrodeposition or sputtering. A sol-gel method is preferred for the purpose of forming coatings over a large area at low cost. In order that transition metals or metal compounds having catalytic reactivity are carried on the basic substrate for CNT growth, common metal carrying methods may be employed such as impregnation, immersion and the sol-gel method, and any methods can be adopted as long as catalysts can be carried on large substrates in an easy and uniform way. Preferred as catalytic metal species are heavy metals including Fe, Co, Ni and Mo.

The carbon compound used to form the CNT film may be of any type that can form CNT in the presence of a suitable catalyst. Examples include saturated hydrocarbon compounds such as methane, ethane and propane, unsaturated hydrocarbon compounds such as ethylene, propylene and acetylene, aromatic hydrocarbon compounds such as benzene and toluene, and oxygen-containing hydrocarbon compounds such as methanol, ethanol and acetone, and methane, ethylene, propylene and acetylene are preferred. These carbon compounds may be introduced in gaseous form either as such or in admixture with inert gases such as argon. Alternatively, they may be introduced as saturated vapors in an inert gas. If desired, in order to make hetero atom containing nanotubes, the carbon compounds may be mixed with compounds that contain boron, nitrogen and other hetero atoms which are to be incorporated into the nanotubes. Thermal decomposition is the most common mechanism for decomposing the carbon compounds and the preferred reaction temperature is between 400 and 1100° C. (more preferably between 500 and 700° C.) and the preferred reaction pressure is between 1 kPa and 1 MPa (more preferably between 10 and 300 kPa).

The CNTs that compose the aligned CNT film as prepared in the first step of the process of the invention have outside diameters of no more than 10 nm and are advantageous for field emission of electrons. The surface of the aligned CNT film is parallel to the substrate and smooth. The height of the aligned CNT film and the densities of the unit CNTs are uniform.

The next step is for patterning a conductive binder on a surface of a substrate for electrode. The conductive binder to be used in this step (4) is required to have such a function that it mechanically bonds the electrode to CNTs and establishes electrical continuity. Cold field-emission cathodes are intended to emit electrons in high vacuum and their electron emitting performance decreases if the degree of vacuum drops. Therefore, the conductive binder is preferably free of any volatile components. Even if volatile components are contained, they are desirably removed as much as possible by drying, heating, washing or any other suitable method once the electrode is bonded to CNTs.

Considering the bonding and electrically conducting capabilities, as well as the fluidity that aids in patterning, conductive paste is preferred as the conductive binder. The simplest way of patterning is screen printing. The conductive paste is usually composed of a conductive filler that imparts electrical conductivity, a high-molecular weight resin that imparts the bonding capability and a volatile solvent that imparts fluidity. Conductive pastes are classified by the material of the conductive filler. For the purposes of the invention, conductive pastes made of metals (e.g. gold, silver and copper) or carbon are preferred.

Low-melting point metals may also be used as conductive binders that are entirely free of volatile components. Preferred examples of low-melting point metals include indium, tin, lead, zinc and copper, as well as alloys of two or more of these metals.

The conductive binder is deposited in a desired pattern on a surface of the substrate for electrode. Any desired patterns can be formed by known printing methods but the conductive binder is preferably deposited in blocks that are electrically insulated from each other.

If conductive paste is used as the conductive binder, it is patterned on a surface of the substrate for electrode while it remains fluid and brought into contact with a surface of the aligned CNT film prepared in the first step and, depending on its curing characteristics, the conductive paste is subjected to drying, compressing, heating or thermocompression so that the mating surfaces are bonded together.

If a low-melting point metal is used as the conductive binder, it is cut into pieces of a specified size, which are arranged on a surface of the electrode, brought into contact with a surface of the aligned CNT film prepared in the first step, and subjected to thermocompression so that the mating surfaces are bonded together.

If the cold field-emission cathode produced by the process of the invention is to be used as an electron source in an image display such as FED, an electrically insulating plate having a conductive circuit preliminarily formed on a surface is preferably used as the substrate for electrode. The electrically insulating plate is preferably made of glass since even large areas can be formed at low cost. The conductive binder is preferably patterned such that it is deposited on the terminals of a preliminarily formed circuit on the surface of the substrate for electrode, since the aligned CNT film is bonded to the conductive binder in the next step and the resulting patterned CNT film can establish electrical continuity to the individual conductive circuit terminals. On the other hand, it is very cumbersome to form a circuit that establishes electrical continuity to the individual patterned units of the aligned CNT film after the aligned CNT film is attached to the substrate for electrode.

In the last step (5), the aligned CNT film prepared in the first step is attached to the substrate for electrode which has the conductive binder formed in a pattern on the surface. For this purpose, the surface of the aligned CNT film is placed in contact with the surface of the conductive binder and drying, compressing, heating or thermocompression is performed so that the mating surfaces bond to each other and, thereafter, the aligned CNT film is stripped from the substrate for electrode. Since the aligned CNT film simply rests physically on the basic substrate, those areas of the CNT film which are bonded to the conductive binder can be easily stripped from the basic substrate. On the other hand, those areas of the CNT film which are not bonded to the conductive binder are not stripped but are left intact on the basic substrate, so the aligned CNT film can be attached to the substrate for electrode in exactly the same pattern as the conductive binder.

If all surfaces of the conductive binder are in contact with the surface of the aligned CNT film which was grown on the surface of the basic substrate, the above-described process A will serve the purpose. However, the basic substrate for CNT growth is usually made of non-deformable materials such as ceramics and quartz. Therefore, if the substrate for electrode which is employed in the last step (5) is in the shape of a curve for example, it is difficult to ensure that the surface of the aligned CNT film which was prepared by the first method for implementing the first step makes contact with the entire surface of the conductive binder. In order to overcome this difficulty, one may employ an aligned CNT film transferred to a deformable sheet.

Thus, it is preferred to employ process B characterized in that between the steps of (1) preparing an aligned carbon nanotube film on a surface of a basic substrate and (4) patterning a conductive binder on a surface of a substrate for electrode, the step (2) is provided which comprises bonding a surface of the aligned carbon nanotube film to a surface of a flexible substrate having a reversibly adhesive surface and then transferring the aligned carbon nanotube film by stripping the basic substrate, leaving those portions of the aligned carbon nanotube film behind which have been bonded to the surface of the flexible substrate.

To implement step (2), the surface of the aligned CNT film growth on the surface of the basic substrate is brought into contact with the surface of a flexible substrate in the form of a deformable sheet and drying, compressing, heating or thermocompression is performed in order to bond the mating surfaces; thereafter, the aligned CNT film is stripped from the basic substrate and transferred to the surface of the flexible substrate.

A flexible substrate having a reversibly adhesive surface can be used as the flexible substrate sheet. The reversibly adhesive surface may be any surface that has weak tackiness or adhesiveness and a tackiness agent or an adhesive is applied to the entire surface of the sheet or to selected areas of a specified pattern. Particularly preferred are sheets having EVA—or acrylic tackiness agents printed thereon. Also applicable are those sheets which have no adhesiveness or tackiness in ordinary environments but which develop such properties in a special environment such as wet atmosphere or high temperature.

The flexible substrate may be chosen from among sheets that deform when pressed against the substrate for electrode and examples are single- or multi-layered sheets made of adhesive resins, thermosetting resins, thermoplastic resins or water-soluble resins.

The advantage of employing the deformable sheet is that in the step (5') of bonding to a surface of the conductive binder a surface of the aligned carbon nanotube film that has been transferred to the flexible substrate, the aligned carbon nanotube film can be brought into full contact with the conductive binder so that it can be effectively bonded to the substrate for electrode.

Specific examples of the flexible substrate include single-layered sheets made of thermoplastic resins, double-layered sheets made of tacky acrylic resin/thermoplastic resin, and adhesive double-layered sheets made of tacky EVA/thermoplastic resin, and exemplary thermoplastic resins include polyolefins, polyesters, polycarbonates, polyamides and polyimides. Also applicable are sheets made of thermosetting resins exemplified by epoxy resins and phenol resins, as well as sheets made of water-soluble resins exemplified by polyvinyl alcohol. If thermosetting conductive paste is employed as the conductive binder in step (5'), the sheets are preferably ones that withstand the temperature at which the paste is cured. If desired, more-than-two-layered sheets having the reversibly adhesive surface may also be employed.

Also preferred is process C, in which the following step (3) is provided between steps (2) and (4): bonding to a surface of a second flexible substrate having a reversibly adhesive surface a surface of the aligned carbon nanotube film that has been transferred to the first flexible substrate and then transferring the aligned carbon nanotube film by stripping the first flexible substrate, leaving those portions of the aligned carbon nanotube film behind which have been bonded to the second reversibly adhesive surface.

The first and the second flexible substrates having the reversibly adhesive surfaces may be the same sheets as the flexible substrate having a reversibly adhesive surface that is employed in process B. In order to ensure that in step (3), the aligned carbon nanotube film has different degrees of adhesiveness and can hence be transferred with high efficiency, different kinds of sheet are preferably employed. If thermosetting conductive paste is employed as the conductive binder in step (5'), the second flexible substrate having the reversibly adhesive surface is preferably a heat-resistant sheet that withstands the temperature at which the paste is cured.

The aligned CNT film that is formed in a pattern on the substrate for electrode by either of the processes A, B and C has a surface that is parallel to the electrode surface and smooth and it features uniform film thickness. The CNTs that compose the aligned CNT film have uniform density and the outside diameter of each CNT is not more than 10 nm, thus proving advantageous for the field emission of electrons.

Thus, according to the process of the invention, there is produced a cold field-emission cathode that employs a multiple of CNTs as electron sources which are uniform in density, have small outside diameter and are aligned vertically, with the individual electron sources forming blocks in a pattern that are electrically insulated from each other and which present surfaces that are parallel to the substrate for electrode and smooth, thereby enabling uniform emission of electrons at low voltage.

Effectiveness of the Invention

According to the process of the invention, there can be produced a cold field-emission cathode that employs a multiple of CNTs as electron sources which are uniform in density, have small outside diameter and are aligned vertically, with the individual electron sources forming blocks in a pattern that are electrically insulated from each other and which present surfaces that are parallel to the substrate for electrode and smooth, thereby enabling uniform emission of electrons at low voltage. The cathode can be employed to fabricate an image display that operates at low voltage to provide uniform brightness.

EXAMPLES

The following examples are provided for further illustrating the present invention but are in no way to be taken as limiting.

Example 1

Process A

[Step of Growing Aligned CNT Film]

A square supporting silica alumina substrate (25% silica and 75% alumina) measuring 2 mm thick and 75 mm on each side was coated with aluminum by vacuum evaporation. The deposited aluminum film had a thickness of 0.5

μm. The substrate was then immersed for 2 hours in an aqueous solution of cobalt nitrate having a concentration of 0.2 mol/L. The substrate was recovered and fired in air at 400° C. for 3 hours to prepare a basic substrate. After firing, the basic substrate was set in a tubular quartz furnace with the aluminum coated side facing up horizontally. With argon being supplied horizontally at a flow rate of 1000 cm$^3$/min, the temperature in the tubular furnace was elevated to 700° C. Subsequently, with the internal temperature kept at 700° C., argon flowing at 1000 cm$^3$/min was mixed with propylene at 300 cm$^3$/min and the mixture was supplied into the tubular furnace. After flowing the propylene/argon mixture gas for 20 minutes, the supply of propylene was switched off so that only argon was flowed; after a while, the heating of the tubular furnace was stopped and the interior of the furnace was left to cool to room temperature. After the end of the reaction, the surface of the basic substrate was examined with a scanning electron microscope (SEM); it was confirmed that an aligned CNT film had been formed in a thickness of 100 μm on the top surface of the basic substrate.

The film was composed of vertically aligned CNTs and it had a uniform thickness with a smooth surface. Transmission electron microscopy (TEM) of the aligned film showed that the constituent CNTs had outside diameters of 5–8 nm and stacked in 5–7 layers.

[Step of Patterning Conductive Binder on a Surface of Substrate for Electrode and the Step of Transferring the Aligned CNT Film from the Basic Substrate to the Surface of Substrate for Electrode]

Figure 1:
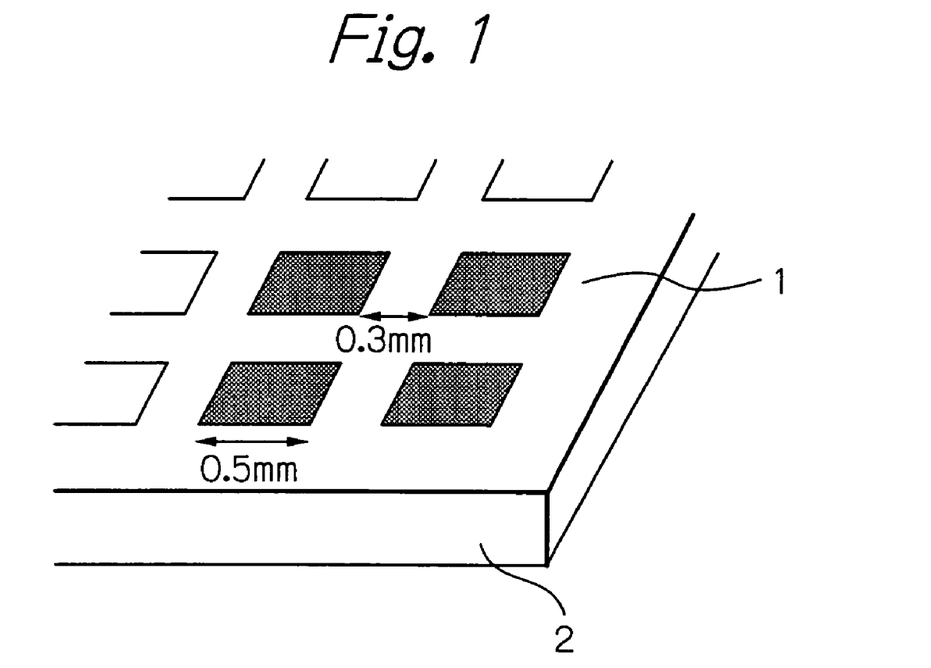
FIG. 1 shows a copper plate having conductive silver paste applied to it by screen printing.
Figure 2:
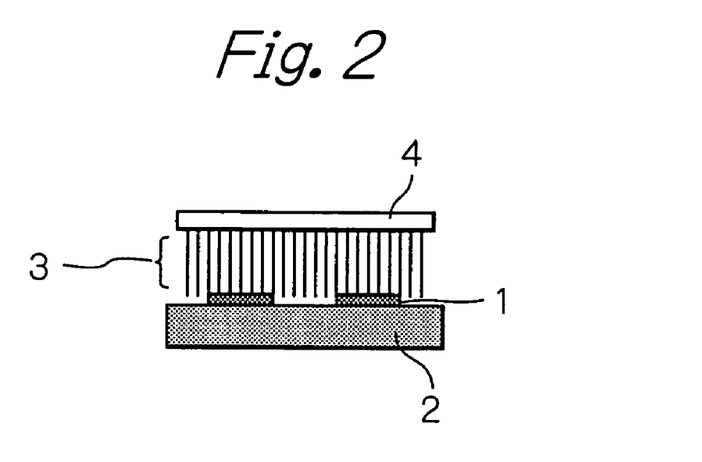
FIG. 2 shows schematically how the copper plate having conductive silver paste applied to it by screen printing is placed in contact with a surface of an aligned CNT film grown on a silica alumina sheet.
Figure 3:
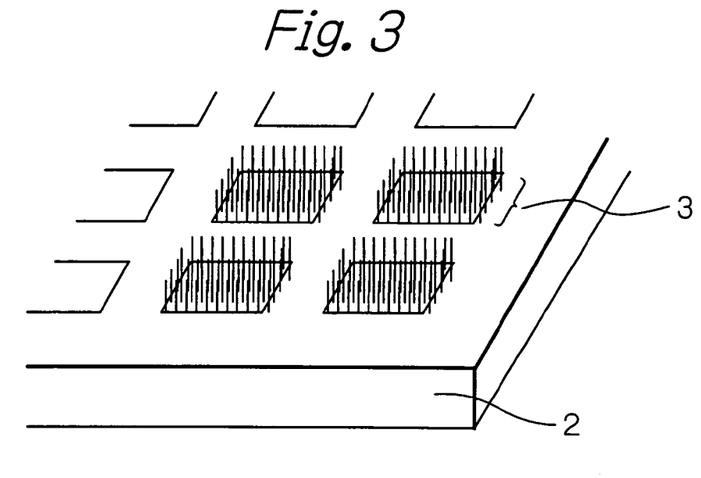
FIG. 3 shows aligned CNT films formed in pattern on a copper plate.
Figure 4:
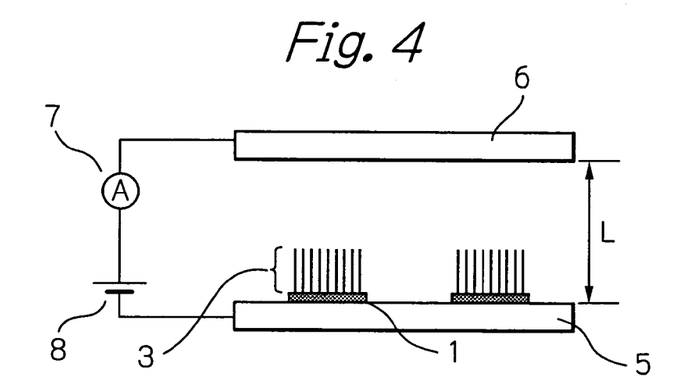
FIG. 4 shows in section a device for measuring field emission of electrons.
Figure 5:
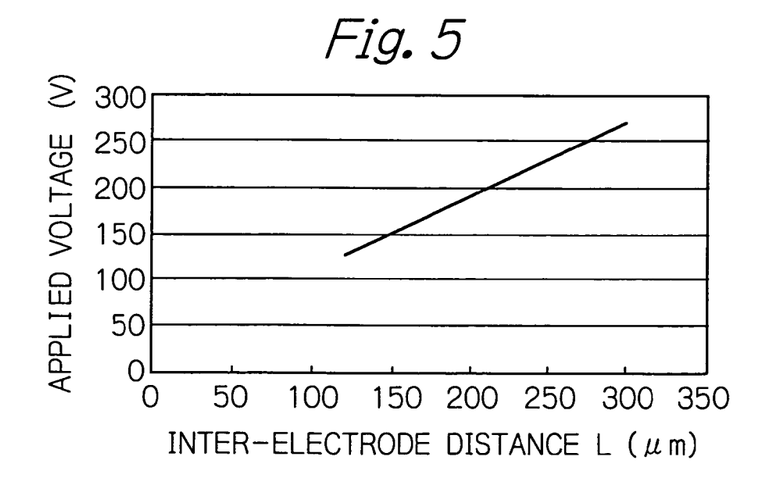
FIG. 5 is a graph showing the characteristics of field emission of electrons as obtained in Example 1.

A square copper plate measuring 2 mm thick and 100 mm on each side was provided as the substrate for electrode. Conductive silver paste was formed in a pattern on the surface of the copper plate by screen printing. The conductive silver paste was applied in a thickness of 10 μm in the pattern shown in FIG. 1, in which the applied silver paste is indicated by 1 and the copper plate by 2. In the next step, the aligned CNT film grown on the aforementioned basic substrate was placed in contact with the surface of the applied conductive silver paste on the copper plate and the assembly was heated up to 180° C. in an argon atmosphere, as shown schematically in section in FIG. 2, in which the aligned CNT film is indicated by 3 and the basic substrate by 4. After cooling, the basic substrate was stripped from the copper plate, leaving the aligned CNT film behind in blocks on the surface of the copper plate, i.e., only in those areas where the conductive silver paste had been applied, with the alignment of CNTs kept intact (see FIG. 3). The individual blocks of aligned film had a uniform thickness of about 100 μm which was substantially the same as the thickness they had before the aligned film was attached to the copper plate; hence, each block of aligned film presented a smooth surface. In this way, an aligned CNT film could be formed in a pattern on the surface of the copper plate. The copper plate fabricated in Example 1 was employed as a cold cathode and its performance in field emission of electrons was measured under a vacuum of 10$^{-6}$ Pa. FIG. 4 is a schematic representation of the electrodes in section; reference numeral 5 indicates the copper plate as cathode, 6 the copper plate as anode, 7 an ammeter, and 8 a dc power supply. The results of the measurement are shown in FIG. 5 which plots the inter-electrode distance L on the horizontal axis and the voltage on the vertical axis which had to be applied to pick up a current density of 10 mA/cm$^2$.

Example 2

Process B

Figure 6:
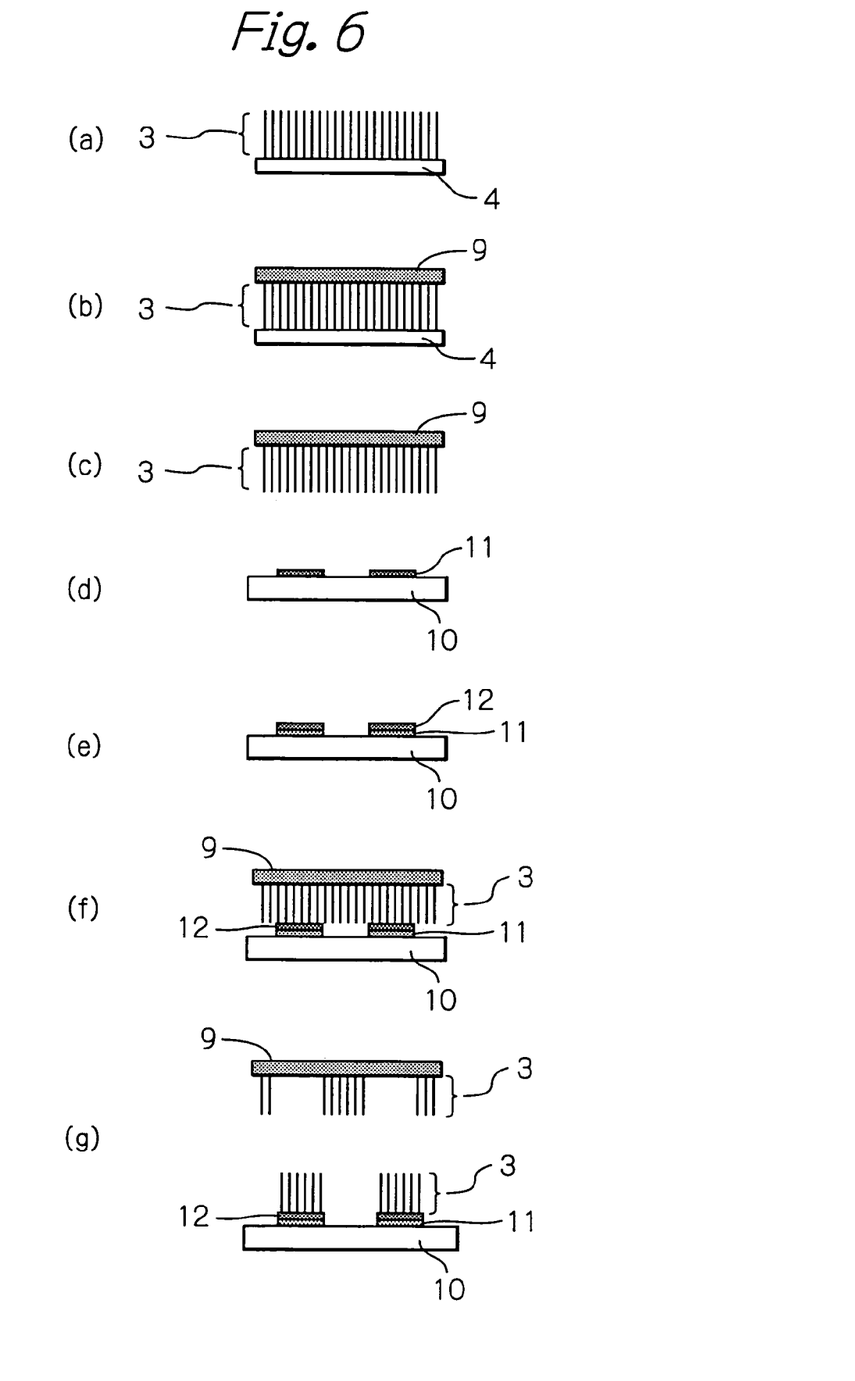
FIGS. 6(a)–6(g) show in section the steps of fabricating a cold cathode capable of field emission of electrons in Example 2.

FIGS. 6(a)–6(g) show in section the sequence of steps in the process for producing a cold field-emission cathode in Example 2. First, as shown in FIG. 6(a), an aligned CNT film 3 was grown on a basic substrate 4 by the same method as in Example 1 employing a silica/alumina substrate as the supporting substrate. Then, as shown in FIG. 6(b), a surface of the aligned CNT film 3 was placed in contact with a surface of an adhesive sheet 9 (flexible substrate) composed of tacky acrylic resin/polyolefin and the assembly was set on a press, where a pressure of 2 kg/cm$^2$ was applied to compress the two members together. The adhesive sheet 9 with the aligned CNT film 3 remaining intact was pulled up to separate from the basic substrate 4 so that the aligned CNT film 3 was transferred to the surface of the adhesive sheet 9 (see FIG. 6(c)). In a separate step, a glass sheet 10 was provided as the substrate for electrode and a conductive layer 11 was formed on its surface (FIG. 6(d)). Then, as shown in FIG. 6(e), conductive carbon paste 12 was screen printed in a thickness of 15 μm on the surface of the conductive layer. In the next step, the surface of the aligned CNT film 3 on the adhesive sheet 9 was placed in contact with the printed conductive carbon paste 12 as shown in FIG. 6(f) and the assembly was heated up to 150° C. in an argon atmosphere. After cooling, as shown in FIG. 6(g), the adhesive sheet 9 was stripped leaving the aligned CNT film 3 behind as bonded to the conductive carbon paste 12, whereby a cold field-emission cathode was fabricated with the aligned CNT film transferred to its surface.

Example 4

Process C

First, an aligned CNT film was grown in a thickness of 50 μm on a basic substrate by the same method as in Example 1 employing a silica/alumina substrate as the supporting substrate. Then, a surface of the aligned CNT film was placed in contact with a surface of a water-soluble PVC sheet (flexible substrate) that had been swollen in a 90% humid atmosphere for 1 hour and the assembly was set on a press, where a pressure of 2 kg/cm$^2$ was applied to compress the two members together. After the compressing and drying, the water-soluble sheet with the aligned CNT film remaining intact was pulled up to separate from the basic substrate so that the aligned CNT film was transferred to the surface of the water-soluble sheet. The surface of the aligned CNT film transferred to the water-soluble sheet was placed in contact with a surface of a flexible substrate which was the same as the adhesive sheet employed in Example 2 and the assembly was set on a press, where a pressure of 2 kg/cm$^2$ was applied to compress the two members together. After the compressing, the whole sample was placed in a 90% humid atmosphere for 1 hour to swell the water-soluble sheet, which was subsequently stripped from the surface of the aligned CNT film so that the aligned CNT film was transferred to the surface of the adhesive sheet. In a separate step, a glass sheet having a conductive layer formed thereon was provided as the substrate for electrode and conductive silver paste was screen printed in a thickness of 15 μm on the surface of the conductive layer. In the next step, the surface of the aligned CNT film on the adhesive sheet was placed in contact with the printed conductive silver paste and the assembly was heated up to 150° C. in an argon atmosphere.

After cooling, the adhesive sheet was stripped leaving the aligned CNT film behind as bonded to the conductive silver paste, whereby a cold field-emission cathode was fabricated with the aligned CNT film transferred to its surface.

Comparative Example 1

Figure 7:
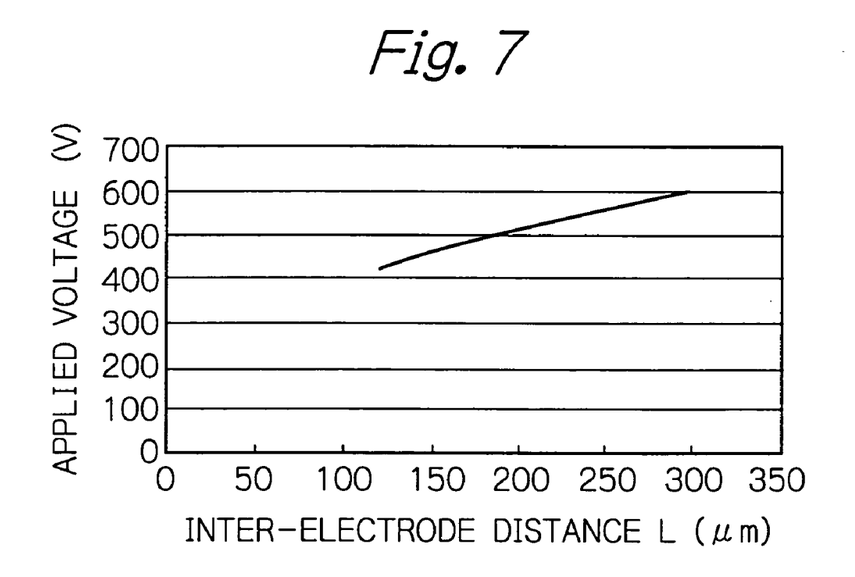
FIG. 7 is a graph showing the characteristics of field emission of electrons as obtained in Comparative Example 1.

First, an aligned CNT film was grown on a basic substrate as in Example 1. Then, the growth of the aligned CNT film was stripped from the basic substrate with a plastic spatula. The stripped CNT was mixed with conductive silver paste and toluene at a weight ratio of 1:8:1 and the ingredients were kneaded carefully. The resulting mixture was screen printed in a pattern on a surface of a copper plate. The copper plate having the pattern of the mixture printed on the surface was placed in an argon atmosphere, where it was heated up to 180° C. in order to remove the volatiles. The individual pattern elements on the copper plate had extensive asperities and unaligned CNTs were interspersed unevenly in silver grains. The copper plate fabricated in Comparative Example 1 was employed as a cold cathode and its performance in field emission of electrons was measured as in Example 1. The results of the measurement are shown in FIG. 7 which plots the inter-electrode distance L on the horizontal axis and the voltage on the vertical axis which had to be applied to pick up a current density of 10 mA/cm$^2$.

In Examples 1–3, constant field emission of electrons was realized uniformly at relatively low applied voltages. In Comparative Example 1, comparatively higher applied voltages were required to realize the same constant field emission of electrons as in the Examples 1–3.

What is claimed is:

1. A process for producing a cold field-emission cathode by patterning an aligned carbon nanotube film on a surface of a substrate for electrode, comprising the steps of;
   preparing an aligned carbon nanotube film on a surface of a basic first substrate;
   patterning a conductive binder on a surface of a second substrate for electrode; and
   bonding a surface of the aligned carbon nanotube film to a surface of the conductive binder and then transferring the aligned carbon nanotube film from the basic first substrate to the conductive binder by stripping the first basic substrate from the conductive binder and the second substrate, leaving those portions of the aligned carbon nanotube film behind which have been bonded to the patterned conductive binder.

2. A process for producing a cold field-emission cathode by patterning an aligned carbon nanotube film on a surface of a substrate for electrode, comprising the steps of:
   preparing an aligned carbon nanotube film on a surface of a basic substrate;
   bonding a surface of the aligned carbon nanotube film to a surface of a flexible substrate having a reversibly adhesive surface and then transferring the aligned carbon nanotube film from the basic substrate to the flexible substrate by stripping the basic substrate, leaving those portions of the aligned carbon nanotube film behind on the flexible substrate which have been bonded to the surface of the flexible substrate;
   patterning a conductive binder on a surface of a substrate for electrode; and
   bonding a surface of the conductive binder to a surface of the aligned carbon nanotube film that has been transferred to the flexible substrate and then transferring the aligned carbon nanotube film from the flexible substrate to the conductive binder by stripping the flexible substrate, leaving those portions of the aligned carbon nanotube film behind on the substrate for the electrode which have been bonded to the conductive binder.

3. A process for producing a cold field-emission cathode by patterning an aligned carbon nanotube film on a surface of a substrate for electrode, comprising the steps of:
   preparing an aligned carbon nanotube film on a surface of a basic substrate;
   bonding a surface of the aligned carbon nanotube film to a surface of a first flexible substrate having a reversibly adhesive surface and then transferring the aligned carbon nanotube film from the basic substrate to the flexible substrate by stripping the basic substrate, leaving those portions of the aligned carbon nanotube film behind on the first flexible substrate which have been bonded to the reversibly adhesive surface;
   bonding to a surface of a second flexible substrate having a reversibly adhesive surface a surface of the aligned carbon nanotube film that has been transferred to the first flexible substrate and then transferring the aligned carbon nanotube film from the first flexible substrate to the second flexible substrate by stripping the first flexible substrate, leaving those portions of the aligned carbon nanotube film behind on the second flexible substrate which have been bonded to the surface of the second flexible substrate:
   patterning a conductive binder on a surface of a substrate for electrode;
   bonding to a surface of the conductive binder a surface of the aligned carbon nanotube film that has been transferred to the second flexible substrate and then transferring the aligned carbon nanotube film to the conductive binder by stripping the second flexible substrate, leaving those portions of the aligned carbon nanotube film behind on the second flexible substrate which have been bonded to the conductive binder.

4. The process according to claim 1, wherein the step of preparing an aligned carbon nanotube film on a surface of a basic substrate comprises decomposing a gaseous carbon compound in the presence of a basic substrate prepared by coating a supporting substrate with an inert substance and then allowing it to carry a transition metal catalyst or a transition metal compound catalyst, whereby a carbon nanotube film is grown on a surface of the basic substrate in a direction perpendicular to the basic substrate.

5. The process according to claim 4, wherein the inert substance with which the supporting substrate is coated is one member of the group consisting of aluminum, germanium and oxides thereof.

6. The process according to claim 4, wherein the supporting substrate is coated with the inert substance by vacuum evaporation, electrodeposition, sputtering or a sol-gel method.

7. The process according to claim 4, wherein the supporting substrate coated with the inert substance is allowed to carry a transition metal catalyst or a transition metal compound catalyst by impregnation, immersion or a sol-gel method.

8. The process according to claim 4, wherein the carbon compound is at least one member of the group consisting of saturated hydrocarbon compounds, unsaturated hydrocarbon compounds, aromatic hydrocarbon compounds and oxygen-containing hydrocarbon compounds.

9. The process according to claim 1, wherein the carbon nanotubes composing the aligned carbon nanotube film have outside diameters not greater than 10 nm.

10. The process according to claim 2, wherein the step of bonding a surface of the aligned carbon nanotube film to a surface of a flexible substrate having a reversibly adhesive surface comprises bringing the surface of the aligned carbon nanotube film into contact with the reversibly adhesive surface of the flexible substrate and performing drying, compressing, heating or thermocompression to bond the two members together.

11. The process according to claim 1, wherein the substrate for electrode is an insulating plate with a conductive circuit preliminarily formed on a surface.

12. The process according to claim 1, wherein the step of patterning a conductive binder on a surface of a substrate for electrode comprises depositing the conductive binder on a conductive circuit.

13. The process according to claim 1, wherein the step of bonding a surface of the aligned carbon nanotube film to a surface of the conductive binder comprises bringing the surface of the aligned carbon nanotube film into contact with the surface of the conductive binder and performing drying, compressing, heating or thermocompression to bond the mating surfaces together.

14. The process according to claim 1, wherein the conductive binder is conductive paste.

15. The process according to claim 14, wherein the conductive paste is conductive silver paste, conductive gold paste, conductive carbon paste or conductive copper paste.

16. The process according to claim 1, wherein the conductive binder is a low-melting point metal.

17. The process according to claim 16, wherein the low-melting point metal is indium, tin, lead, zinc, copper or an alloy containing at least one of these metals.

18. The process according to claim 2, wherein the flexible substrate having a reversibly adhesive surface is a resin sheet coated with a tackiness agent on a surface.

19. The process according to claim 2, wherein the step of preparing an aligned carbon nanotube film on a surface of a basic substrate comprises decomposing a gaseous carbon compound in the presence of a basic substrate prepared by coating a supporting substrate with an inert substance and then allowing it to carry a transition metal catalyst or a transition metal compound catalyst, whereby a carbon nanotube film is grown on a surface of the basic substrate in a direction perpendicular to the basic substrate.

20. The process according to claim 2, wherein the carbon nanotubes composing the aligned carbon nanotube film have outside diameters not greater than 10 nm.

21. The process according to claim 2, wherein the substrate for electrode is an insulating plate with a conductive circuit preliminarily formed on a surface.

22. The process according to claim 2, wherein the step of patterning a conductive binder on a surface of a substrate for electrode comprises depositing the conductive binder on a conductive circuit.

23. The process according to claim 2, wherein the step of bonding a surface of the aligned carbon nanotube film to a surface of the conductive binder comprises bringing the surface of the aligned carbon nanotube film into contact with the surface of the conductive binder and performing drying, compressing, heating or thermocompression to bond the mating surfaces together.

24. The process according to claim 2, wherein the conductive binder is conductive paste.

25. The process according to claim 2, wherein the conductive binder is a low-melting point metal.

26. The process according to claim 3, wherein the step of preparing an aligned carbon nanotube film on a surface of a basic substrate comprises decomposing a gaseous carbon compound in the presence of a basic substrate prepared by coating a supporting substrate with an inert substance and then allowing it to carry a transition metal catalyst or a transition metal compound catalyst, whereby a carbon nanotube film is grown on a surface of the basic substrate in a direction perpendicular to the basic substrate.

27. The process according to claim 3, wherein the carbon nanotubes composing the aligned carbon nanotube film have outside diameters not greater than 10 nm.

28. The process according to claim 3, wherein the step of bonding a surface of the aligned carbon nanotube film to a surface of a flexible substrate having a reversibly adhesive surface comprises bringing the surface of the aligned carbon nanotube film into contact with the reversibly adhesive surface of the flexible substrate and performing drying, compressing, heating or thermocompression to bond the two members together.

29. The process according to claim 3, wherein the substrate for electrode is an insulating plate with a conductive circuit preliminarily formed on a surface.

30. The process according to claim 3, wherein the step of patterning a conductive binder on a surface of a substrate for electrode comprises depositing the conductive binder on a conductive circuit.

31. The process according to claim 3, wherein the step of bonding a surface of the aligned carbon nanotube film to a surface of the conductive binder comprises bringing the surface of the aligned carbon nanotube film into contact with the surface of the conductive binder and performing drying, compressing, heating or thermocompression to bond the mating surfaces together.

32. The process according to claim 3, wherein the conductive binder is conductive paste.

33. The process according to claim 3, wherein the conductive binder is a low-melting point metal.

34. The process according to claim 3, wherein the flexible substrate having a reversibly adhesive surface is a resin sheet coated with a tackiness agent on a surface.

35. The process of claim 1, wherein said carbon nanotube film comprises carbon nanotubes that are vertically aligned with respect to said basic substrate.

36. The process of claim 2, wherein said carbon nanotube film comprises carbon nanotubes vertically aligned with respect to said basic substrate.

37. The process of claim 3, wherein said carbon nanotube film comprises carbon nanotubes vertically aligned with respect to said basic substrate.

* * * * *